United States Patent
Rince et al.

(10) Patent No.: US 9,590,506 B2
(45) Date of Patent: Mar. 7, 2017

(54) MULTIPLE MODE POWER REGULATOR

(71) Applicants: Jean-Christophe Patrick Rince, Roques (FR); Mohammed Mansri, Toulouse (FR); Alexandre Pujol, Ste Foy d'Aigrefeuille (FR)

(72) Inventors: Jean-Christophe Patrick Rince, Roques (FR); Mohammed Mansri, Toulouse (FR); Alexandre Pujol, Ste Foy d'Aigrefeuille (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/713,116

(22) Filed: May 15, 2015

(65) Prior Publication Data

US 2016/0172973 A1 Jun. 16, 2016

(30) Foreign Application Priority Data

Dec. 15, 2014 (WO) .................. PCT/IB2014/003122

(51) Int. Cl.
*H02M 3/158* (2006.01)
*H02M 1/00* (2006.01)

(52) U.S. Cl.
CPC .... *H02M 3/158* (2013.01); *H02M 2001/0045* (2013.01)

(58) Field of Classification Search
CPC .................................................... H02M 3/158
See application file for complete search history.

(56) References Cited

U.S. PATENT DOCUMENTS

| | | |
|---|---|---|
| 6,984,969 B1 | 1/2006 | Liu et al. |
| 7,095,218 B2 | 8/2006 | Kobayashi |
| 7,710,089 B2 | 5/2010 | Kohout et al. |
| 7,990,119 B2 | 8/2011 | Petty |
| 8,067,925 B2 | 11/2011 | Grimm |
| 8,368,368 B2 | 2/2013 | Qiu et al. |
| 8,493,045 B2 | 7/2013 | Renton et al. |
| 2005/0116697 A1 | 6/2005 | Matsuo et al. |
| 2005/0179423 A1 | 8/2005 | Xing |
| 2007/0085520 A1 | 4/2007 | Ho |
| 2008/0122419 A1 | 5/2008 | Shimizu et al. |
| 2009/0284235 A1* | 11/2009 | Weng .................... H02M 3/156 323/222 |
| 2010/0134085 A1 | 6/2010 | Nishida |

(Continued)

FOREIGN PATENT DOCUMENTS

| | | |
|---|---|---|
| WO | 2013/000955 A2 | 1/2013 |
| WO | 2013/098246 A1 | 7/2013 |
| WO | 2013/130088 A1 | 9/2013 |

*Primary Examiner* — Jue Zhang
(74) *Attorney, Agent, or Firm* — Charlene R. Jacobsen (57) ABSTRACT

A power regulator includes an output terminal to provide a regulated voltage, a first control unit to control a first operation mode, a second control unit to control a second operation mode, and a detection unit connected to the output terminal. The detection unit detects, at start-up, whether or not an external inductor is connected to the output terminal, activates the first operation mode when an external inductor is detected, and activates the second operation mode when no external inductor is detected. The detection unit also detects in which of at least two distinct inductance ranges the inductance of the detected inductor lies so as to provide inductance dependent control in the first operation mode.

20 Claims, 4 Drawing Sheets

(56) References Cited

U.S. PATENT DOCUMENTS

| | | | |
|---|---|---|---|
| 2011/0215781 A1* | 9/2011 | Sasaki | G05F 1/10 323/283 |
| 2012/0025799 A1 | 2/2012 | Tournatory et al. | |
| 2012/0161732 A1* | 6/2012 | Renton | H02M 3/156 323/275 |
| 2014/0111169 A1* | 4/2014 | Polarouthu | H02M 3/156 323/271 |

* cited by examiner

MULTIPLE MODE POWER REGULATOR

CROSS REFERENCE TO RELATED APPLICATION(S)

The present application claims priority to International Patent Application No. PCT/IB2014/003122, entitled "MULTIPLE MODE POWER REGULATOR," filed on Dec. 15, 2014, the entirety of which is herein incorporated by reference.

FIELD OF THE INVENTION

This invention relates to a power regulator having multiple modes of operation. More in particular, the invention relates to a power regulator configured for automatically selecting a mode on the basis of load detection.

BACKGROUND OF THE INVENTION

Power regulators are known per se. They serve to keep a supply voltage and/or supply current within a certain range. A so-called switched mode power supply (SMPS) is arranged for switching a current on and off, typically at a high frequency. A linear regulator is simpler and produces no noise but has a higher power dissipation.

International Patent Application WO 2013/130088 discloses a dual mode voltage regulator having a passive regulator circuit, a switching regulator circuit and a controller circuit. An external select input is arranged for receiving external parameters which can be determined by the controller circuit so as to select one of the regulator circuits. This known regulator has the drawback that it depends on external parameters to select a mode and that the regulator is ineffective if the external parameters are not supplied.

U.S. Pat. No. 7,710,089 discloses a power regulator which automatically configures to work in either SPMS mode or linear mode. This known regulator has a dedicated pin which may be connected to a boot capacitor or to ground. An auto-detect circuit detects in which way the dedicated pin is connected. This known regulator has the disadvantage that a dedicated pin must be connected in a certain way to select a mode.

U.S. Pat. No. 8,067,925 discloses a power regulator circuit which can be operated in switching mode under high load current load conditions and in linear mode under light load current conditions. To this end, a detection circuit detects the stationary output current and/or voltage and controls the switching between the two modes. This known regulator has the disadvantage that properties of the regulator circuit itself are not taken into account when selecting a mode.

U.S. Pat. No. 8,493,045 discloses a voltage regulator which is configurable to operate in one of two modes, one of which involves an inductor. To determine whether an inductor is coupled to the voltage regulator, a detection circuit determines whether a regulator output of the voltage regulator resists a change in current driven to the regulator output.

SUMMARY OF THE INVENTION

The present invention provides a power regulator, as well as an integrated circuit provided with a power regulator, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In the following, for sake of understanding, the circuitry is described in operation. However, it will be apparent that the respective elements are arranged to perform the functions being described as performed by them.

Figure 1:
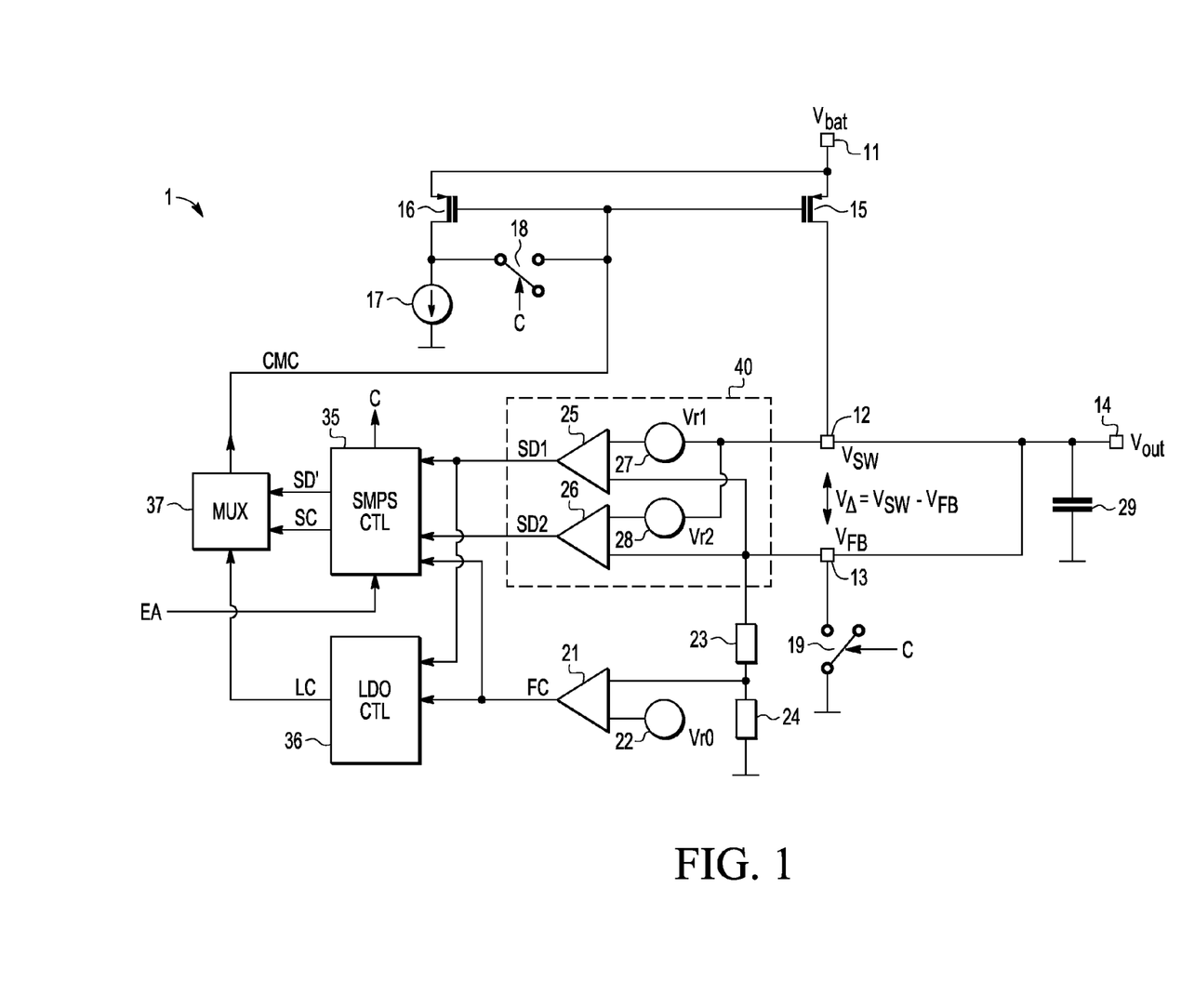
FIG. 1 schematically shows an example of an embodiment of a power regulator without an inductor.
Figure 2:
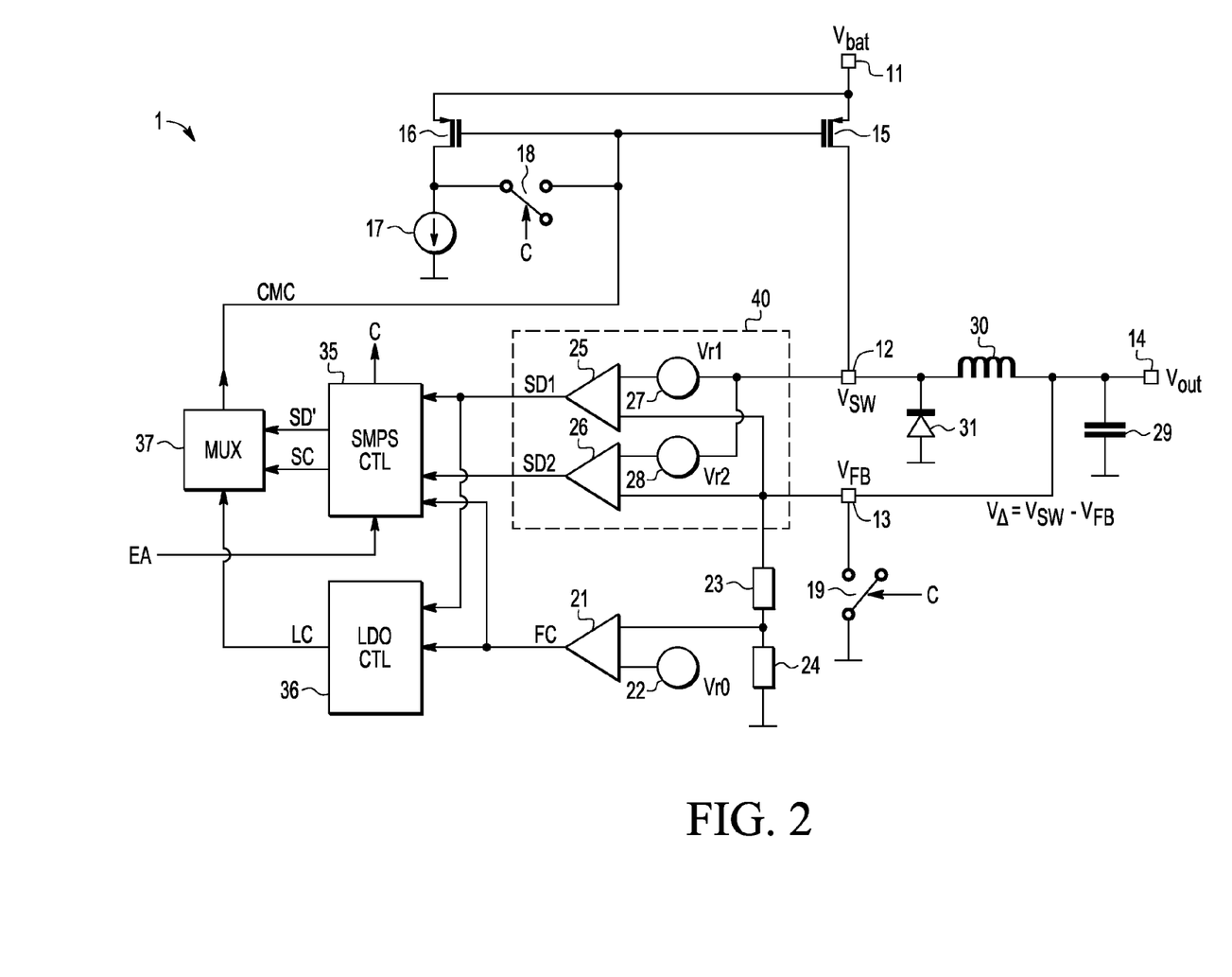
FIG. 2 schematically shows an example of an embodiment of a power regulator with an inductor.

The merely exemplary embodiment of a power regulator 1 illustrated in FIG. 1 comprises four terminals, in addition to ground. A first terminal 11 is connected to the supply voltage (typically battery voltage) Vbat. A second terminal 12 carries a voltage Vsw while a third terminal 13 receives a feedback voltage $V_{FB}$ from the fourth terminal 14, which is the output terminal carrying the output voltage Vout. It can be seen in FIG. 1 that there is a direct (feedback) connection between the fourth or output terminal 14 and the third or feedback terminal 13. In the embodiment of FIG. 1, there is also a direct connection between the second (or switched) terminal 12 and the fourth or output terminal 14. This direct connection between the second and fourth terminals may be replaced with another component, such as an inductor, as will later be explained in more detail, in particular with reference to FIG. 2. In the embodiments of FIGS. 1 and 2, a smoothing capacitor 29 is connected between the fourth (or output) terminal 14 and ground.

The power regulator 1 of FIG. 1 comprises a current mirror consisting of a first transistor 15 and a second transistor 16, the gates of which are connected. The first transistor 15 is connected between the first terminal 11 and the second terminal 12, while the second transistor 16 is connected between the first terminal 11 and a current source 17, which is not shown in detail for the sake of simplicity of the drawing. Those skilled in the art will appreciate how a current source can be realised. The current source 17 may be connected to ground. A first switch 18, which may be controlled via a switch control signal C, may connect the gate and the drain of the second transistor 16 at start-up so as to initiate the current mirror. Similarly, a second switch 19, which may also be controlled via the control signal C, may connect the third or feedback terminal 13 to ground at start-up. The control signal C, which controls the switches 18 and 19, may be produced by the first control unit 35 in response to an (external) enable signal EA.

The power regulator 1 further comprises a first control unit 35 for controlling a first operation mode, a second control unit 36 for controlling a second operation mode, and a detection unit 40 connected to the output terminal 14. The first control unit 35 is in the embodiment shown arranged for an SMPS (Switched Mode Power Supply: switched) mode of operation of the power regulator, while the second control unit 36 is in the embodiment shown arranged for an LDO (Low Drop-Out: linear) mode of operation of the power regulator. Both control units receive input signals from the detection unit 40, which is active during start-up of the power regulator, and from a feedback comparator 21, which is active during the normal operation of the power regulator. Both the first control unit 35 and the second control unit 36 produce output signals which are fed to a multiplexer ("MUX") 37, which multiplexes the output signals to produce a current mirror control signal CMC. The current mirror control signal CMC is fed to the current mirror, that is, to the gates of the transistors 15 and 16. In dependence of the current mirror control signal CMC, the current mirror and hence transistor 15 will provide a controlled current to the second terminal 12 and from there to the fourth or output terminal 14.

More in particular, the first (SMPS) control unit 35 receives SMPS-Detect signals SD1 and SD2 from the detection unit 40 during start-up, as will later be explained in more detail, and also receives a feedback comparator signal FC from the feedback comparator 21 during normal operation of the power regulator. The second (LDO) control unit 36 receives SMPS-Detect signal SD1 from the detection unit 40 during start-up and the feedback comparator signal FC from the feedback comparator 21 during normal operation. The SMPS-Detect signal SD1 indicates whether an inductor was detected and hence whether the power regulator should operate in SMPS or linear mode. In an embodiment, a "high" (e.g. 3 V) SMPS-Detect signal SD1 may indicate that an inductor was detected and that the power regulator should operate in SMPS mode, while a "low" (e.g. 0 V) SMPS-Detect signal SD1 may indicate that no inductor was detected and that the power regulator should operate in linear mode. The SMPS-Detect signal SD1 may therefore activate the first (SMPS) control unit 35 while deactivating the linear (LDO) control unit 36, and vice versa. A latched version SD' of the SMPS-Detect signal SD1 is sent by the first control unit 35 to the multiplexer 37 to enable the multiplexer to select the current control signal, that is, the SMPS control signal SC produced by the first control unit 35 or the linear control signal LC produced by the second control unit 36. Both control signals SC and LC are derived from the feedback comparator signal FC by the respective control unit.

It can be seen that the feedback comparator 21 compares a voltage derived from the voltage $V_{FB}$ at the third or feedback terminal 13 with an operational reference voltage Vro produced by the operational reference voltage source 22. Resistors 23 and 24 divide the voltage $V_{FB}$ at the third terminal 13 so as to offer a percentage of the voltage $V_{FB}$ to the feedback comparator 21, while the operational reference voltage Vro is set at a suitable value, in accordance with the resistances of resistors 23 and 24, to produce a suitable feedback comparator signal FC. It will be understood by those skilled in the art that the operational reference voltage Vro provides a threshold with which the said percentage of the voltage $V_{FB}$ is compared to produce the feedback signal FC.

It can further be seen that the feedback comparator signal FC, produced by the feedback comparator 21, is used by the control units to produce control signals LC and SC, one of which is selected by the multiplexer 37 to serve as current mirror control signal CMC. The selection by the multiplexer 37 is, in turn, based upon the (latched version SD' of the) SMPS-Detect signal SD1 produced by the detection unit 40.

The detection unit 40 may comprise a first comparator 25 and a second comparator 26. One input of the first comparator 25 is connected to a first reference voltage source 27 which provides a first reference voltage Vr1 (the details of the reference voltage source 27 are omitted from FIGS. 1 & 2 for the sake of simplicity of the drawings). Another input of the first comparator 25 is connected to the third terminal 13 to receive the feedback voltage $V_{FB}$. The first reference voltage source 27 is further connected to the second terminal 12, so that the first comparator receives a voltage equal to the sum of the voltage Vsw at terminal 12 and the first reference voltage Vr1. The first comparator 25 therefore compares the first reference voltage Vr1 plus the voltage Vsw with the voltage $V_{FB}$ at the third terminal 13, and hence with the output voltage Vout at the fourth terminal 14. As described above, the third terminal 13 is connected to ground during start-up, due to the switch 19 being closed. Accordingly, $V_{FB}$ equals zero during start-up. It will be understood that after start-up, the switches 18 and 19 will be opened to allow the normal operation of the power regulator.

The detection unit 40 of FIGS. 1 & 2 further comprises a second comparator 26, one input of which is connected to a second reference voltage source 28 which provides a second reference voltage Vr2, while the other input of the second comparator 26 is also connected to the third terminal 13 to also receive the feedback voltage $V_{FB}$ (the details of the reference voltage source 28 are also omitted from FIGS. 1 & 2 for the sake of simplicity of the drawings). The second reference voltage source 28 is also connected to the second terminal 12 to receive the voltage Vsw and accordingly, the second comparator 26 receives the sum of the voltage Vsw and the second reference voltage Vr2.

As mentioned above, the second terminal 12 and the fourth (or output) terminal 14 may be connected directly, as shown in FIG. 1, or may be connected via an intermediate component, such as the inductor shown in FIG. 2. The presence or absence of an additional component, such as an inductor, may influence the operation of the power regulator 1. In the absence of an inductor, as illustrated in FIG. 1, the power regulator may better be used in linear mode, while in the presence of an inductor, as illustrated in FIG. 2, the power regulator may better be used in another mode, such as SMPS (Switched Mode Power Supply) mode, also referred to as switched mode.

The power regulator 1 of FIGS. 1 & 2 is configured for automatically determining which mode to use. In addition, it is configured for differentiating between two or more types of switched mode, depending on the inductance (or "size") of the inductor. To this end, the power regulator 1 of FIGS. 1 & 2 comprises the detection unit 40 provided with two (or more) comparators: the first comparator 25 and the second comparator 26. It is noted that in other embodiments (not shown) more comparators may be provided to differentiate between three or more types of a particular mode.

The second comparator 26, and any optional subsequent comparators, makes it possible to distinguish between small and large inductances, and to change the control (that is, compensation) behaviour of the control unit 35, as will be explained in more detail below.

In the embodiment of FIG. 2, the direct connection between the second terminal 12 (Vsw) and the fourth terminal 14 (Vout) is replaced with an inductor 30. In addition, a diode 31 may be connected between the second terminal 12 (Vsw) and ground to short-circuit any voltage peaks generated by the inductor 30. As mentioned above, the power regulator 1 is configured both for determining whether an inductor is present and for determining a range in which the inductance of the inductor lies.

Figure 3A:
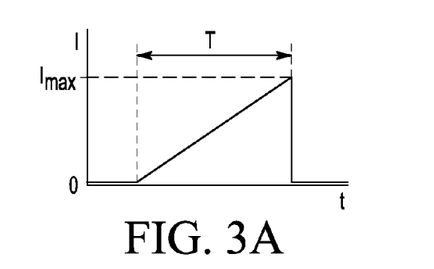
FIGS. 3A-E schematically show examples of currents and voltages in the absence of an inductor.
Figure 3B:
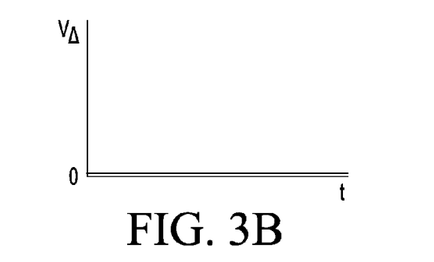
Figure 3C:
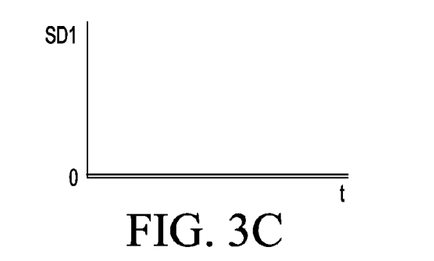
Figure 3D:
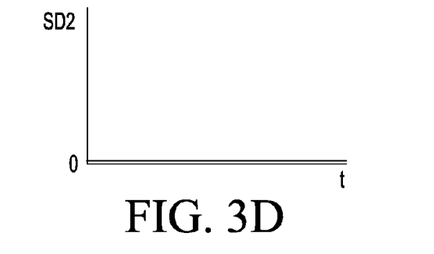
Figure 3E:
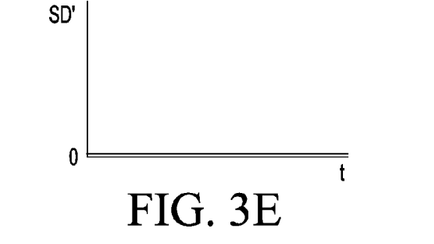

The operation of the power regulator 1 at start-up is illustrated in FIGS. 3A-E and 4A-E. At start-up (that is, typically, powering up) of the power regulator 1, the switches 18 and 19 are closed, thus initiating the current mirror constituted by transistors 15 and 16, and connecting the third terminal 13 and hence the fourth (output) terminal 14 to ground, respectively. The current mirror is configured for generating a current I which, during a period T, increases from 0 to a maximum current Imax, and then reverts back to zero, as illustrated in FIG. 3A. In the embodiment of FIG. 1, without an inductor, the voltage difference VΔ between the second (Vsw) and the third ($V_{FB}$) terminal is always equal to zero, as illustrated in FIG. 3B. The first comparator 25 and the second comparator 26 will therefore have output voltages SD1 and SD2 equal to zero, as illustrated in FIGS. 3C and 3D. Accordingly, the first control unit 35 may produce an SMPS control voltage SD' equal to zero, corresponding with a linear operation of the power regulator.

Figure 4A:
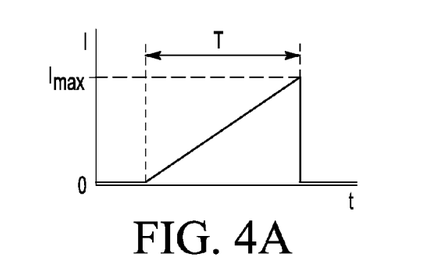
FIGS. 4A-E schematically show examples of currents and voltages in the presence of an inductor.
Figure 4B:
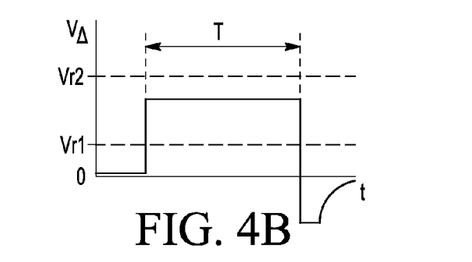
Figure 4C:
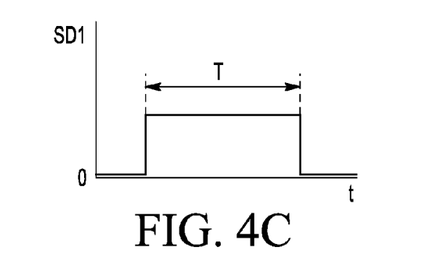
Figure 4D:
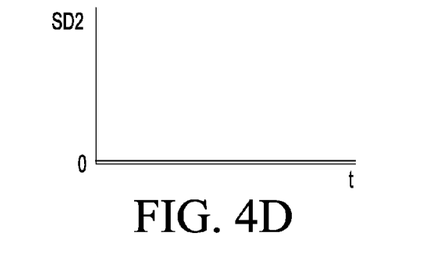
Figure 4E:
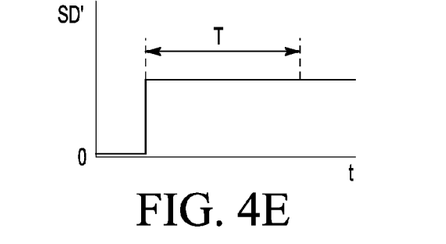

In the embodiment of FIG. 2, the current mirror is also configured for generating a current I which, during a start-up period T as enabled by the control signal C, increases from 0 to Imax, and then reverts back to zero, as illustrated in FIG. 4A. In the embodiment of FIG. 2, with an inductor 30, the voltage difference VΔ between the second (Vsw) and the third ($V_{FB}$) terminal will not always be equal to zero, as illustrated in FIG. 4B. The voltage across the inductor 30, which is equal to the voltage difference VΔ between the second terminal 12 and the third terminal 13 and which may be written as VΔ=Vsw−$V_{FB}$, will rise steeply when the current I is applied. At the end of the period T, the sudden drop in the current I makes the voltage VΔ become negative, as illustrated in FIG. 4B. This voltage VΔ, to which a first reference voltage Vr1 and a reference voltage Vr2 is added, is fed to the comparators 25 and 26 respectively. As illustrated in FIG. 4B, the reference voltages Vr1 and Vr2 produce thresholds for the voltage VΔ: this voltage is only detected when it exceeds the first reference voltage Vr1. When it exceeds Vr1, as illustrated in FIG. 4B, the first comparator 25 produces a comparison voltage SD1 that is greater than zero during the period T, as illustrated in FIG. 4C. This comparison voltage SD1 may be used to activate a switched control mode in the first control unit 35. In addition, the first control unit 35 may produce a (preferably latched) version SD' of the SMPS-Detect signal SD1 to control the multiplexer 37. This signal SD', as may be output by the first control unit 35, is illustrated in FIG. 4E. As it is latched, the signal SD' will remain greater than zero after the time period T has expired. It will be understood that in other embodiments, the signal SD' may be produced by a separate control unit instead of by the first (SMPS) control unit 35.

It can also be seen in the example of FIG. 4B that the voltage VΔ does not exceed the second threshold Vr2. The output signal SD2 of comparator 26 will therefore be equal to zero, as illustrated in FIG. 4D. The fact that the comparator signal SD1 is greater than zero (see FIG. 4C) but that the comparator signal SD2 is equal to zero indicates that the voltage VΔ lies in a first range. If both comparator signals would have been greater than zero, then the voltage VΔ would lie in a second, higher range. These ranges are indicative of the inductance of the inductor 30.

The present invention is based on the insight that during the time period T, the voltage over the inductor 30 has a value VΔ which is equal to the product of the inductance L and the maximum current Imax, divided by the duration T:

$$V\Delta = L \times I\text{max}/T \quad (1)$$

Accordingly, the voltage VΔ is linearly proportional to the inductance L of the inductor 30. As a result, an indication of the inductance can be achieved by determining the range in which the inductance lies. It will be understood that the number of ranges can be increased by using additional comparators having suitable reference voltages, and that by increasing the number of ranges the accuracy of the inductance determination can be improved and hence the switched control. In the embodiments of FIGS. 1 & 2, the control unit 20 may use the inductance range determined in this way to produce a corresponding SMPS compensation signal.

Figure 5A:
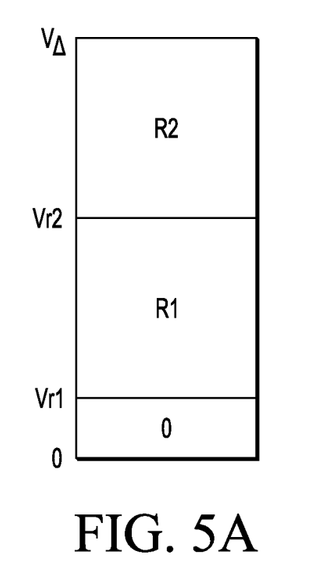
FIGS. 5A-B schematically show examples of inductance ranges as may be detected by a power regulator.
Figure 5B:
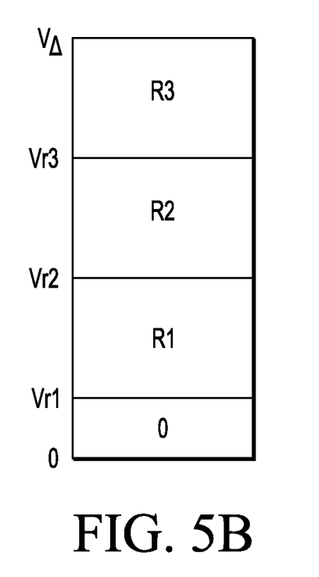

Inductance ranges which may be determined by the power regulator 1 are schematically illustrated in FIGS. 5A and 5B. The example of FIG. 5A may correspond with the power regulator of FIG. 2, of which the behaviour is illustrated in FIGS. 4A-E. In the example of FIG. 5A, two inductance ranges R1 and R2 are distinguished, based upon two reference voltages Vr1 and Vr2. The first reference voltage Vr1 serves to distinguish the voltage VΔ (see FIG. 2) from noise. If the voltage VΔ is smaller than the first reference voltage Vr1, then it will be concluded that the voltage VΔ is equal to zero. If the voltage VΔ exceeds the first reference voltage Vr1 but is smaller than the second reference voltage Vr2, then it is concluded that the inductance lies in the first range R1. If the voltage VΔ also exceeds the second reference voltage Vr2, then it is concluded that the inductance lies in the second range R2. Accordingly, the first control unit 35 may adapt its control method to the inductance range. More in particular, the first control unit 35 may adapt the SMPS control signal SC so as to provide more or less SMPS compensation, depending on the detected inductance range.

In the example of FIG. 5B, three inductance ranges R1, R2 and R3 are distinguished, corresponding with three reference voltages Vr1, Vr2 and Vr3. A power regulator which distinguishes three inductance ranges may have a detection unit (40 in FIG. 2) which is provided with three comparators. Accordingly, such an embodiment may have a detection unit with a third comparator and a third reference voltage source. It will be understood that by adding comparators and associated voltage reference sources, more than three inductance ranges may be distinguished, such as four, five or even eight inductance ranges.

Figure 6:
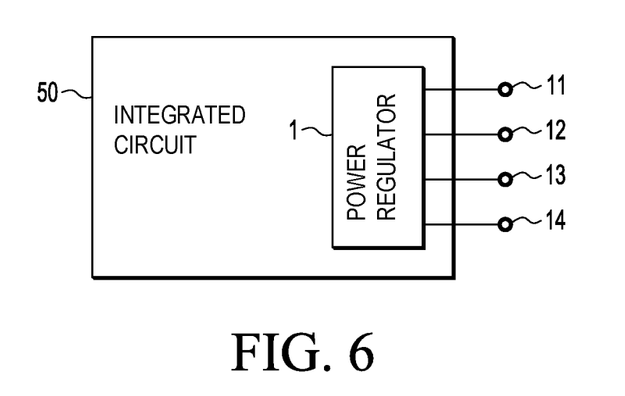
FIG. 6 schematically shows an example of an embodiment of an integrated circuit provided with a power regulator.

An integrated circuit may comprise a power regulator as described above. When part of an integrated circuit, the terminals 11-14 of the power regulator may be terminals of the integrated circuit, and the inductor (or the wire when no inductor is present) may be external to the integrated circuit. This is schematically illustrated in FIG. 6, where an integrated circuit 50 is shown to comprise a power regulator 1 with associated terminals 11, 12, 13 and 14.

It will be understood that many modifications are possible. The diode 31 shown in FIGS. 1 & 2, for example, may be replaced with a transistor. The control units 35 and 36 may be replaced with other suitable units. Further units may be part of the power regulator.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

It will therefore be understood by those skilled in the art that many modifications and additions can be made without departing from the scope of the invention as defined in the appending claims.

The invention claimed is:

1. A power regulator having a first operational mode and a second operational mode, the power regulator comprising:
    an output terminal configured to provide a regulated voltage;
    a first control unit configured to control the power regulator in the first operational mode;
    a second control unit configured to control the power regulator in the second operational mode; and
    a detection unit connected to the output terminal, the detection unit configured to detect, at start-up, whether or not an external inductor is connected to the output terminal, wherein the detection unit is further connected to the first control unit to activate the first operation mode when an external inductor is detected, and to the second control unit to activate the second operation mode when no external inductor is detected, wherein
    the detection unit is further configured to detect in which of first and second distinct inductance ranges an inductance of the detected inductor lies so as to provide inductance dependent control in the first operation mode.

2. The power regulator according to claim 1, wherein the detection unit is configured to detect the external inductor by determining a voltage difference between output terminals during a predetermined time period.

3. The power regulator according to claim 2, wherein the detection unit comprises at least two comparators, each comparator being supplied with a distinct reference voltage.

4. The power regulator according to claim 2, further comprising current ramp circuitry configured to provide a current ramp during the predetermined time period.

5. The power regulator according to claim 1, wherein the detection unit comprises at least two comparators, each comparator being supplied with a distinct reference voltage.

6. The power regulator according to claim 5, further comprising current ramp circuitry configured to provide a current ramp during the predetermined time period.

7. The power regulator according to claim 1, further comprising current ramp circuitry configured to provide a current ramp during a predetermined time period.

8. The power regulator according to claim 1, wherein the first operation mode is a linear mode.

9. The power regulator according to claim 1, wherein the second operation mode is a switched mode.

10. An integrated circuit provided with a power regulator according to claim 1.

11. A power regulator having a first operational mode and a second operational mode, the power regulator comprising:
    an output terminal configured to a provide a regulated voltage;
    a first control unit configured to control the power regulator in the first operational mode;
    a second control unit configured to control the power regulator in the second operational mode; and
    a detection unit connected to the output terminal, the detection unit configured to detect, at start-up, whether or not an external inductor is connected to the output terminal, wherein the detection unit is further connected to the first control unit to activate the first operation mode when an external inductor is detected, and to the second control unit to activate the second operation mode when no external inductor is detected, the detection unit is further arranged to detect in which of first and second distinct inductance ranges an inductance of the detected inductor lies so as to provide inductance dependent control in the first operation mode;
    current ramp circuitry including a current mirror and a current source circuit, the current ramp circuitry configured to provide a current ramp during a predetermined time period.

12. The power regulator of claim 11, wherein the first operation mode is a linear mode.

13. The power regulator of claim 11, wherein the second operation mode is a switched mode.

14. A method comprising:
    detecting, by a detection unit of a power regulator, at start-up, whether an external inductor is connected to an output terminal of the power regulator, wherein the detection unit is connected to an output terminal of the power regulator, the output terminal to provide a regulated voltage;
    activating the power regulator in a first operation mode in response to the external inductor being detected;
    activating the power regulator in a second operation mode in response to the external inductor not being detected;
    detecting in which of first and second distinct inductance ranges an inductance of the detected inductor lies so as to provide inductance dependent control when the power regulator is in the first operation mode;

controlling, by a first control unit, the power regulator if the power regulator is in the first operational mode; and controlling, by a second control unit, the power regulator if the power regulator is in the second operational mode.

15. The method of claim 14, further comprising:

determining, by the detection unit, a voltage difference between output terminals during a predetermined time period to detect whether the external inductor connected to the output terminal.

16. The method of claim 14, wherein the detection unit includes first and second comparators, each comparator being supplied with a distinct reference voltage.

17. The method of claim 14, wherein the detection unit includes current ramp circuitry to provide a current ramp during a predetermined time period.

18. The method of claim 17, wherein the current ramp circuitry comprises a current mirror and a current source circuit.

19. The method of claim 14, wherein the first operation mode is a linear mode.

20. The method of claim 14, wherein the second operation mode is a switched mode.

* * * * *